US008387768B2

(12) United States Patent
Sauter

(10) Patent No.: US 8,387,768 B2
(45) Date of Patent: Mar. 5, 2013

(54) PARKING LOCK DEVICE FOR MOTOR VEHICLE

(75) Inventor: Bernhard Sauter, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 254 days.

(21) Appl. No.: 12/984,719

(22) Filed: Jan. 5, 2011

(65) Prior Publication Data

US 2011/0162937 A1     Jul. 7, 2011

(30) Foreign Application Priority Data

Jan. 7, 2010   (DE) .......................... 10 2010 000 725

(51) Int. Cl.
  *F16H 63/38*  (2006.01)
  *B60T 1/06*   (2006.01)

(52) U.S. Cl. .................................. 192/219.5

(58) Field of Classification Search ............... 192/219.5
  See application file for complete search history.

(56) References Cited

U.S. PATENT DOCUMENTS 6,279,713 B1      8/2001 Young et al.
  2005/0133338 A1 *  6/2005 Eschenbeck et al. ...... 192/219.5

FOREIGN PATENT DOCUMENTS

DE   102007026412 A1 * 12/2008
  DE   10 2008 054 467 A1  6/2010
  DE   102008054469 A1 *  6/2010
  EP       0 695 908 A1    2/1996

* cited by examiner

*Primary Examiner* — Richard M. Lorence
*Assistant Examiner* — Lillian Nguyen
(74) *Attorney, Agent, or Firm* — Davis & Bujold, PLLC

(57) ABSTRACT

A parking lock device for a motor vehicle transmission including a parking lock gear, a locking pawl, a locking element with an operating rod as well as a guide plate. The locking pawl engages with and blocks the parking lock gear when the parking lock is engaged and locked by the locking element, and when the parking lock is disengaged, the locking pawl disengages from the parking lock gear and can be locked in a form-locked manner. An unlocking element is fixed to the operating rod, and the unlocking element disengages the form lock before the parking lock is engaged. The locking element is arranged on a leaf spring which has a fixed end, a free end and a center arranged between the fixed and the free ends. The center can be moved outwardly by the unlocking element and the locking element is arranged on the free end.

10 Claims, 1 Drawing Sheet

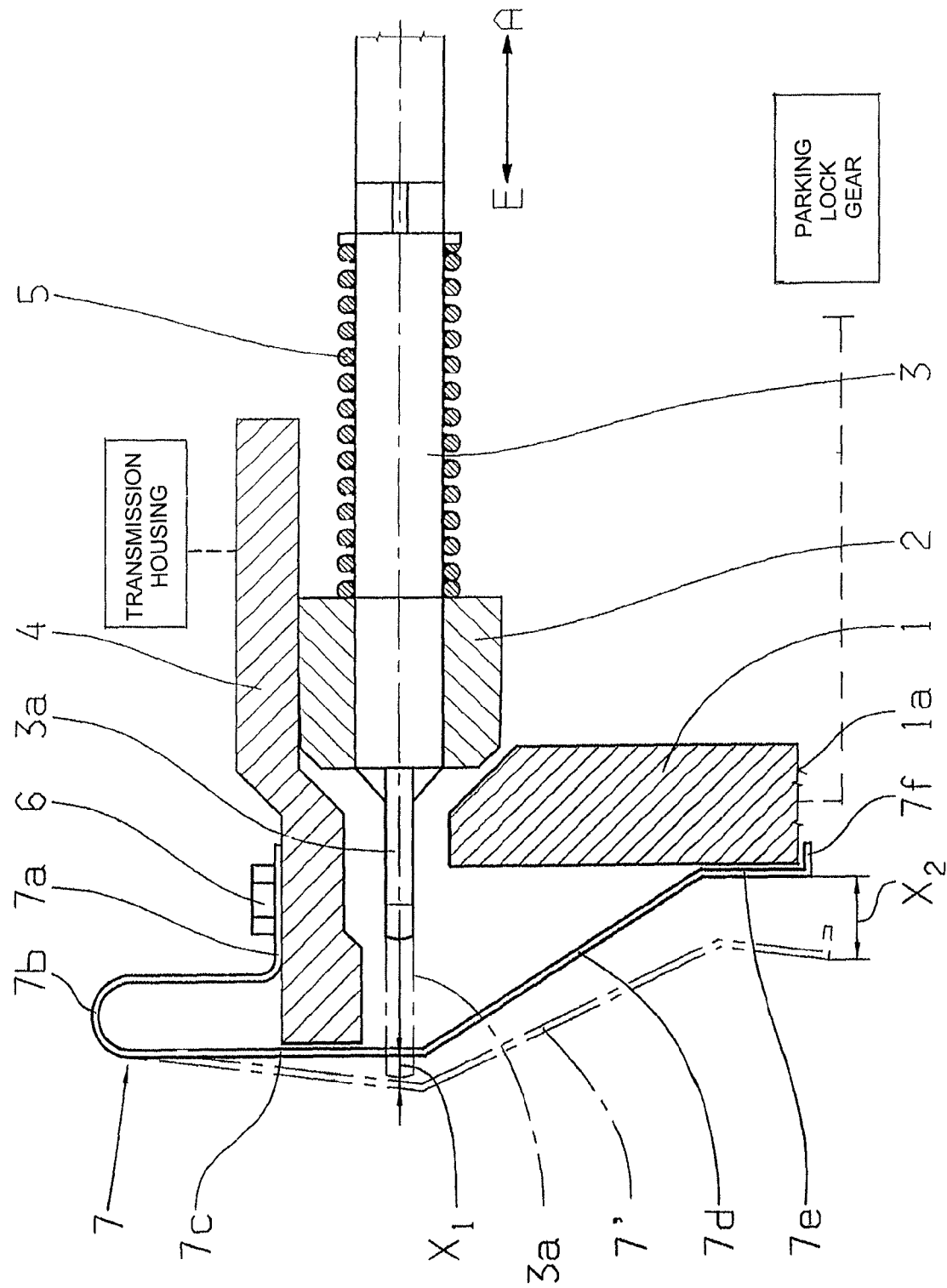

PARKING LOCK DEVICE FOR MOTOR VEHICLE

This application claims priority from German patent application serial no. 10 2010 000 725.0 filed Jan. 7, 2010.

FIELD OF THE INVENTION

The invention relates to a parking lock device for a motor vehicle transmission.

BACKGROUND OF THE INVENTION

The invention is aimed at resolving the problem that, under certain operating conditions, e.g. severe vibrations of the transmission with the parking lock disengaged, there can be contact between the locking pawl and the parking lock gear, which could lead to destruction of the parking lock system. In the previous patent application of the applicant, this problem is solved by a locking pin, which is fixed to a leaf spring, has an effect of securing the locking pawl in a form-locked manner and prevents contact between the locking pawl and the parking lock gear. With the arrangement according to the previous patent application, the spring leaf is fixed at one end to the housing, while the free, opposite end is deflected by an unlocking element located at the top of the push rod. This deflection of the leaf spring causes the unlocking of the locking pawl, whereby the locking element lies a small distance behind the free end of the leaf spring. Thus, a reduction of the displacement takes place, i.e. the unlocking element or the push rod must move a larger distance backwards than the locking element.

SUMMARY OF THE INVENTION

It is the task of this invention to make further improvements to the parking lock device in accordance with the previous patent application.

With the parking lock device in accordance with the claim, there is the advantage of a displacement ratio from the unlocking element at the push rod (also referred to as the operating rod in the following) to the securing or locking element, which is located at the free end of the leaf spring. The push rod with the unlocking element engages between the pivot point or the fixing point of the leaf spring and the free end of the leaf spring. This results in the displacement of the locking element being larger than the displacement of the unlocking element at the push rod. Thus, larger tolerances of the components can be compensated for. Another advantage is the ease of assembly of the leaf spring, which can preferably be fixed to the guide plate. The new locking device can be assembled with ease and can be retrofitted readily in existing transmissions.

In accordance with a preferred embodiment, the leaf spring has an elbow in the area of its fixed end, as a result of which the fixed point gets displaced outwards while deflecting the leaf spring and the spring displacement is increased.

In accordance with another preferred embodiment, the leaf spring is bent at its free end and forms a locking lug, which engages with an appropriate opening of the locking pawl or engages behind a locking edge of the locking pawl. The locking pawl is, thus, secured in a form-locked manner when the parking lock is engaged.

BRIEF DESCRIPTION OF THE DRAWINGS

An embodiment of the invention is illustrated in the drawing and is described in detail in the following, whereby other features and/or benefits may be derived from the description and/or the only drawing which shows a parking lock device according to the invention.

DETAILED DESCRIPTION OF THE PREFERRED EMBODIMENTS

The one and only figure illustrates a cross-section of a parking lock device, based on the German patent application bearing the file reference no. 10 2008 054 467.1, which was previously filed by the applicant and is described, at least in part, in the disclosure of this patent application. The parking lock device includes a locking pawl 1, a locking element in the form of a detent 2, which is arranged on a push rod 3 (also referred to as an operating rod) such that the detent is supported to slide on a guide plate 4 on the side of the housing. The detent 2 is loaded when engaging the parking lock by a differential spring 5 supported by the push rod 3. A pin-shaped unlocking element 3a is fixed at the front end of the push rod 3. The figure diagrammatically illustrates the parking lock device with the parking lock in the disengaged position, i.e. the locking pawl 1 is spaced from and does not engage in a parking lock gear, i.e. an output shaft of the transmission that has also not been shown in the FIGURE is not blocked. A leaf spring 7 is fixed to the guide plate 4, with the help of a fixing element 6, preferably a fixing screw 6. The leaf spring 7 has the following sections: a fixed end 7a, an elbow 7b, a first leg section 7c, a second leg section 7d, a third leg section 7e and a securing or locking element 7f. The leaf spring 7 has been illustrated in the locking position by the continuous lines, while the leaf spring 7', indicated by a dotted line, shows the unlocked position. In the locked position 7, the locking element 7f, which is formed as a bent locking lug, engages in the locking edge 1a of the locking pawl 1. The locking pawl 1 is unlocked automatically by axial movement of the push rod 3 in the arrow direction E when the parking lock is engaged; the parking lock is disengaged in the opposite direction shown by the arrow A. With the movement of the push rod 3 in the direction E, the unlocking element 3a encounters the first leg section 7c of the leaf spring 7 and deflects it towards the left as shown in the FIGURE by the position 7'. With this outward deflection, there is a displacement along a path $x_1$. The free end of the leaf spring 7 with the locking element 7f gets displaced along a path $x_2$. It can be clearly seen from the illustration drawing that the displacement $x_2$ is considerably larger than the displacement $x_1$, and there is a transformation of the displacement from $x_1$ to $x_2$ that takes place, i.e. $x_2 > x_1$. The ratio $x_2 : x_1$ can be affected by the leg sections 7c, 7d and 7e as required. The advantage of this displacement ratio can be seen from the fact that inaccuracies or tolerances in the manufacture of the components, e.g. the leaf spring 7 can be compensated for. After the locking element 7f has now released the locking pawl 1, the detent 2 can be pushed to its end position owing to the pre-loading of the compensating spring 5 between the steering plate 4 and the locking pawl 1, until the locking pawl 1 has fallen in a gap between the teeth of the parking lock gear. While disengaging the parking lock the push rod 3 is pulled back in the arrow direction A, i.e. the unlocking element 3a clears the path for the leaf spring 7 so that it can move back from its position 7' to the locked position 7.

REFERENCE CHARACTERS

1 Locking pawl
1a Locking edge
2 Detent

3 Operating rod/push rod
3a Unlocking element
4 Steering plate
5 Compensating spring
6 Fixing screw
7 Leaf spring
7a Fixed (clamped) end
7b Elbow
7c First leg section
7d Second leg section
7e Third leg section
7f Locking element
A Operating direction (disengaging)
E Operating direction (engaging)
$X_1$ Spring displacement
$X_2$ Spring displacement

The invention claimed is:

1. A parking lock device for a motor vehicle transmission having a transmission housing, the parking lock device comprising:
a parking lock gear,
a locking pawl (1),
a detent (2) with an operating rod (3) as well as a guide plate (4), the locking pawl (1) engaging in the parking lock gear and blocking the parking lock gear when the parking lock device is engaged and locked by the detent (2), and when the parking lock device is disengaged, the locking pawl (1) disengages from the parking lock gear and is lockable in a form-locked manner,
an unlocking element (3a) being fixed to the operating rod (3), and the unlocking element disengages the form lock before the parking lock device is engaged,
a locking element (7f) being arranged on a leaf spring (7), which has a fixed end (7a), a freely swiveling end (7e) and a center piece (7c) located between the fixed end and the freely swiveling end, the center piece (7c) being movable by the unlocking element (3a) and the locking element (7f) being arranged on the freely swiveling end (7e); wherein the fixed end (7a) is fixed to the guide plate (4).

2. The parking lock device according to claim 1, wherein the leaf spring (7) has an elbowed region (7b) which connects to the fixed end (7a).

3. The parking lock device according to claim 1, wherein the locking element (7f) is formed as a single piece with the leaf spring (7).

4. The parking lock device according to claim 3, wherein the leaf spring (7) is bent at its freely swiveling end (7e) and forms the locking element (7f).

5. The parking lock device according to claim 1, wherein the unlocking element (3a) gets displaced backwards by a first amount (x1) and the locking element (7f) gets displaced backwards by a second amount (x2), whereby the second amount (x2)>the first amount (x1).

6. A parking lock for a motor vehicle transmission having a transmission housing and a parking lock gear, the parking lock comprising:
a locking pawl (1),
a detent (2) with an operating rod (3) as well as a guide plate (4),
the locking pawl (1) engaging and locking the parking lock gear when the parking lock is engaged and locked by the detent (2), and when the parking lock is disengaged, the locking pawl (1) disengages the parking lock gear and is lockable in a form-locked manner,
an unlocking element (3a) being fixed to the operating rod (3), and the unlocking element (3a) disengages the form lock before the parking lock is engaged, a locking element (7f) being arranged on a remote freely swiveling end (7e) of a leaf spring (7), the leaf spring (7) having a fixed end (7a), and a center piece (7c) which is positioned between the fixed end (7a) and the remote freely swiveling end (7e) of the leaf spring (7), the center piece (7c) of the leaf spring (7) being biased outwardly by the unlocking element (3a) such that the locking element (7f) of the leaf spring (7) disengages the locking pawl (1); wherein the fixed end (7a) is fixed to the guide plate (4).

7. The parking lock device according to claim 6, wherein the leaf spring (7) has an elbowed region (7b) which connects to the fixed end (7a).

8. The parking lock device according to claim 6, wherein the locking element (7f) is formed as a single piece with the leaf spring (7).

9. The parking lock device according to claim 8, wherein the locking element is a locking lug (7f) that is formed by a bend in the remote free end (7e) of the leaf spring (7).

10. The parking lock device according to claim 6, wherein the unlocking element (3a) is displaced backwards by a first amount ($x_1$) and the locking element (7f) gets displaced backwards by a second amount ($x_2$), and the second amount ($x_2$) is greater than the first amount ($x_1$).

* * * * *